(12) United States Patent
Hatano

(10) Patent No.: US 11,364,749 B2
(45) Date of Patent: Jun. 21, 2022

(54) PNEUMATIC TIRE, PNEUMATIC-TIRE MOLD, TWO-DIMENSIONAL-CODE ENGRAVED-MARK TESTING METHOD, AND PNEUMATIC-TIRE MANUFACTURING METHOD

(71) Applicant: The Yokohama Rubber Co., LTD., Tokyo (JP)

(72) Inventor: Atsuya Hatano, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/494,280

(22) PCT Filed: Mar. 14, 2018

(86) PCT No.: PCT/JP2018/009990
§ 371 (c)(1),
(2) Date: Sep. 13, 2019

(87) PCT Pub. No.: WO2018/180497
PCT Pub. Date: Oct. 4, 2018

(65) Prior Publication Data
US 2020/0070592 A1 Mar. 5, 2020

(30) Foreign Application Priority Data
Mar. 28, 2017 (JP) .............................. JP2017-062088

(51) Int. Cl.
*B60C 13/02* (2006.01)
*B60C 13/00* (2006.01)
*B29D 30/72* (2006.01)

(52) U.S. Cl.
CPC ............ *B60C 13/001* (2013.01); *B29D 30/72* (2013.01); *B29D 2030/728* (2013.01)

(58) Field of Classification Search
CPC ..... B60C 13/00; B60C 13/001; B60C 13/002; B60C 13/02; B60C 13/023; B60C 15/024; B60C 13/003
See application file for complete search history.

(56) References Cited

U.S. PATENT DOCUMENTS 4,343,342 A * 8/1982 McDonald ............ B60C 13/001
152/523
8,330,074 B2 * 12/2012 Crim ...................... B23K 26/36
219/121.68
(Continued)

FOREIGN PATENT DOCUMENTS

DE 407359 * 12/1924
EP 2 905 125 8/2015
(Continued)

OTHER PUBLICATIONS https://rechneronline.de/pi/curved-rectangle.php, no date.*
(Continued)

*Primary Examiner* — Justin R Fischer
(74) *Attorney, Agent, or Firm* — Thorpe North & Western

(57) ABSTRACT

A tire side surface of a pneumatic tire includes a two-dimensional code in which a dot pattern is formed by two types of gray scale elements formed identifiable from each other by recesses and protrusions of the tire side surface, or a predetermined two-dimensional code arrangement region. The tire side surface further includes at least two marks formed in a protruded shape or a recessed shape, and the two marks are disposed on an identical position in a first direction of a tire radial direction and a tire circumferential direction and disposed separated from each other at different positions in a second direction of the tire radial direction and the tire circumferential direction to sandwich an outer edge of the two-dimensional code or the predetermined two-
(Continued)

dimensional code arrangement region from the opposite sides in at least one of the tire radial direction or the tire circumferential direction.

7 Claims, 10 Drawing Sheets

(56) References Cited

U.S. PATENT DOCUMENTS

| | | |
|---|---|---|
| 2006/0151451 A1 | 7/2006 | Smith, Jr. et al. |
| 2014/0091001 A1* | 4/2014 | Chan .................. G09F 3/0297 206/459.5 |
| 2017/0011666 A1 | 1/2017 | Kraus |
| 2017/0050473 A1 | 2/2017 | Muhlhoff et al. |
| 2017/0080656 A1 | 3/2017 | Muhlhoff et al. |
| 2017/0213117 A1 | 7/2017 | Kraus |

FOREIGN PATENT DOCUMENTS

| | | | |
|---|---|---|---|
| EP | 2 977 934 | | 1/2016 |
| JP | 2002-211214 | * | 7/2002 |
| JP | 2004-345310 | | 12/2004 |
| JP | 2007-516103 | | 6/2007 |
| JP | 2013-159317 | * | 8/2013 |
| JP | 2014-121899 | * | 7/2014 |
| WO | WO 2005/000714 | | 1/2005 |
| WO | WO 2015/118155 | | 8/2015 |
| WO | WO 2015/165862 | | 11/2015 |
| WO | WO 2015/165863 | | 11/2015 |
| WO | WO 2016/012412 | | 1/2016 |

OTHER PUBLICATIONS

Machine translation of JP 2002-211214, 2002.*
International Search Report for International Application No. PCT/JP2018/009990 dated Jun. 19, 2018, 4 pages, Japan.

* cited by examiner

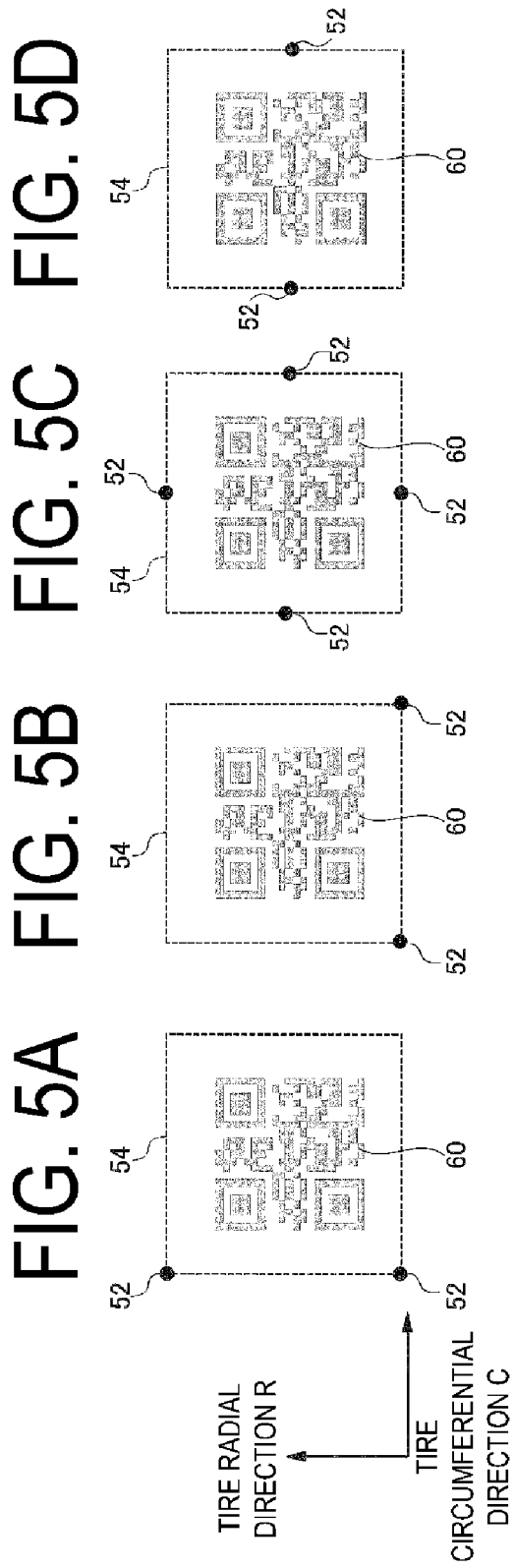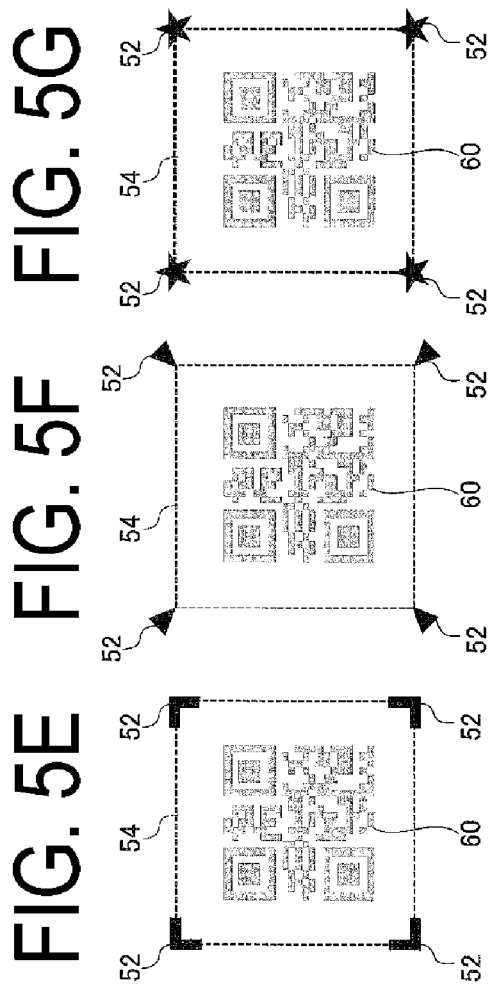

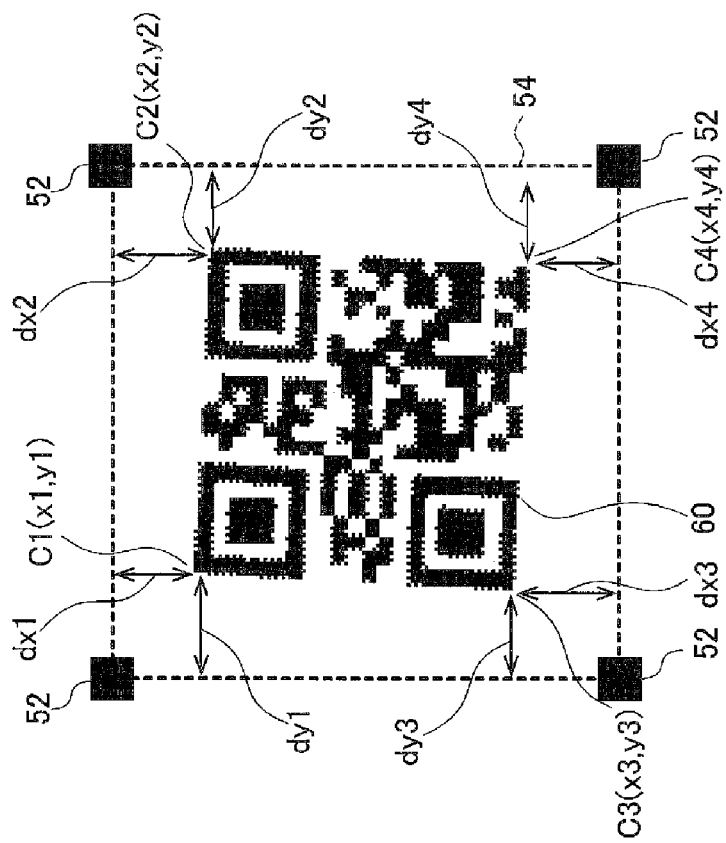
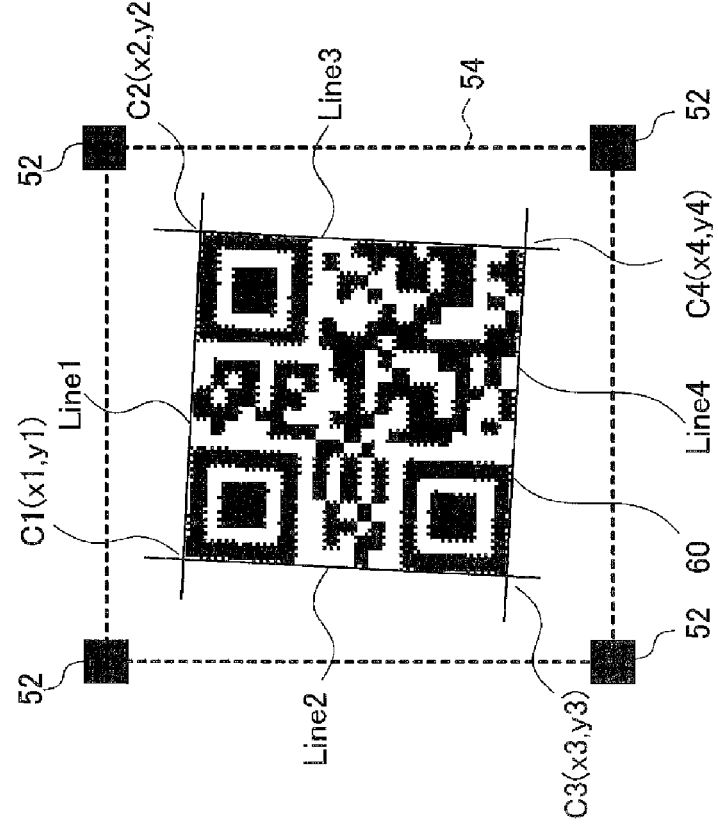

_US 11,364,749 B2_

PNEUMATIC TIRE, PNEUMATIC-TIRE MOLD, TWO-DIMENSIONAL-CODE ENGRAVED-MARK TESTING METHOD, AND PNEUMATIC-TIRE MANUFACTURING METHOD

TECHNICAL FIELD

The present technology relates to a pneumatic tire, a mold for a pneumatic tire, a method for inspecting engraving of a two-dimensional code, and a method for manufacturing a tire. Specifically, the present technology relates to a pneumatic tire provided with a two-dimensional code on a tire side surface, a pneumatic tire mold for manufacturing the pneumatic tire, a method for inspecting the position of engraving of a two-dimensional code of a pneumatic tire, and a method for manufacturing a pneumatic tire by engraving a two-dimensional code.

BACKGROUND ART

In the related art, a tire is known that is provided with a two-dimensional code on a tire side surface. Since the two-dimensional code can contain more information than a one-dimensional code, various information is included in the two-dimensional code and thus the tire can be managed. In particular, a two-dimensional code is provided on a tire side surface by engraving a pattern of predetermined dot holes on the tire side surface (International Patent Publication No. WO 2005/000714).

A two-dimensional code formed by engraving a pattern of predetermined dot holes on a tire side surface does not disappear as long as the tire side surface is not worn, and thus a tire can be effectively managed.

When a two-dimensional code is engraved by providing dot holes in such a pneumatic tire, relative positional misalignment may be generated between the pneumatic tire and an engraving device. When the positional misalignment is generated, the position of an engraving of the two-dimensional code is deviated from a predetermined position. Consequently, the two-dimensional code may not be automatically read by a two-dimensional code reading device. Also, a two-dimensional code is a noticeable side pattern that can be visually recognized. Accordingly, there may occur a defect in appearance such that the engraving of two-dimensional code is not located in an appropriate location on the tire side surface or is not appropriately orientated. For example, the two-dimensional code may interfere with other side patterns, alphanumerics, symbols, or markings formed on the sidewall surface of the tire, which results in a poor appearance.

Also, depending on the size of the pneumatic tire and the side pattern of the sidewall surface, a region where the two-dimensional code can be engraved may be limited. Accordingly, the position of the engraving of the two-dimensional code may be changed in accordance with the size of the pneumatic tire and the side pattern of the sidewall surface. However, a technique for engraving a two-dimensional code in an appropriate orientation at an appropriate location of a tire side surface including a sidewall surface is not known. Also, a technique for inspecting whether a two-dimensional code is engraved in an appropriate orientation at an appropriate location on a tire side surface is not known.

Accordingly, a region where a two-dimensional code is engraved is significantly small on a tire side surface such as a sidewall surface of a pneumatic tire with a very low aspect ratio. Accordingly, target dimensions related with the size of the two-dimensional code are desirably changed in accordance with the size and aspect ratio of the tire. Thus, the engraved two-dimensional code is preferably inspected to see whether the engraved two-dimensional code is sized to have the target dimensions determined in accordance with the size and aspect ratio of the tire. However, a technique for inspecting to see whether the engraved two-dimensional code is sized to have the target dimensions is not known.

SUMMARY

The present technology provides a manufacturing method for a pneumatic tire, which can manufacture a pneumatic tire engraved with a two-dimensional code provided in an appropriate position or in an appropriate orientation, an inspection method for inspecting an engraving of a two-dimensional code provided on a pneumatic tire, and a pneumatic tire engraved with a two-dimensional code provided in an appropriate position or in an appropriate orientation, and a mold for an unengraved pneumatic tire without a two-dimensional code, the mold being used to manufacture the pneumatic tire engraved with the two-dimensional code provided in an appropriate position or in an appropriate orientation.

One aspect of the present technology is a pneumatic tire. The pneumatic tire includes a tread portion contactable with a road surface, sidewall portions provided sandwiching the tread portion from opposite sides in a tire lateral direction, and bead portions connected to the sidewall portions and located inward of the sidewall portions in a tire radial direction.

At least one tire side surface of the sidewall portions or the bead portions includes a two-dimensional code in which a dot pattern is formed by two types of gray scale elements formed identifiable from each other by recesses and protrusions of the at least one tire side surface, and at least two marks formed in a protruded shape or a recessed shape. The marks are disposed on an identical position in a first direction of the tire radial direction and a tire circumferential direction and disposed separated from each other at different positions in a second direction of the tire radial direction and the tire circumferential direction to sandwich an outer edge of the two-dimensional code from opposite sides in at least one of the tire radial direction or the tire circumferential direction.

Each of the marks preferably serves as a marker that defines a quadrangular frame, and a size and orientation of the quadrangular frame and a position of the quadrangular frame on the tire side surface are identified with the marks. The outer edge of the two-dimensional code is preferably provided within the quadrangular frame without being in contact with the quadrangular frame.

A region of the at least one tire side surface, which is disposed between the outer edge and the quadrangular frame is preferably a smooth surface.

The two-dimensional code preferably has a structure in which an arrangement region of the two-dimensional code surrounded by the outer edge of the two-dimensional code corresponds to a plurality of unit cell regions obtained by dividing the arrangement region into rectangular grids having an identical size and in which recessed portions of the recesses and protrusions of the at least one tire side surface are arranged such that each of the recessed portion forms one of the plurality of unit cell regions, which is a darkened portion of the gray scale elements. The two-dimensional code is preferably a QR Code (registered trademark), and a separation distance between the arrangement region and the quadrangular frame is preferably at least eight or more times longer than a size of the unit cell region.

The outer edge of the two-dimensional code preferably has a rectangular shape, and the two-dimensional code is preferably disposed such that at least one side of the outer edge of the two-dimensional code is parallel to one side of the quadrangular frame.

The marks preferably include two marks. A distance between the marks is preferably the length of one side of the quadrangular frame, and the marks are preferably aligned in parallel to one side of the quadrangular frame.

The mark preferably includes a first pair of marks A disposed on an identical position in the tire radial direction and disposed at different positions in the tire circumferential direction, and a second pair of marks B disposed at a position different from the position of the pair of marks A in the radial direction and on an identical position with each other in the tire radial direction and disposed at different positions in the tire circumferential direction. Vertexes of the quadrangular frame are preferably located at the pair of marks A and the pair of marks B.

Another aspect of the present technology is a mold for a pneumatic tire. The mold is configured to manufacture an unengraved pneumatic tire with a two-dimensional code not engraved on a surface of at least one tire side surface of sidewall portions or bead portions.

The mold includes an inner surface contactable with the tire side surface of the unengraved pneumatic tire. The inner surface includes at least two recessed holes or at least two protruded portions that are disposed on an identical position in a third direction of a mold radial direction and a mold circumferential direction and disposed separated from each other at different positions in a fourth direction of the mold radial direction and the mold circumferential direction to sandwich an outer edge of a predetermined arrangement corresponding region having a smooth surface and corresponding to a predetermined two-dimensional code arrangement region having a smooth surface to be engraved with the two-dimensional code, from opposite sides in the mold radial direction corresponding to a tire radial direction or the mold circumferential direction corresponding to a tire circumferential direction.

Another aspect of the present technology is an inspection method for inspecting an engraving of a two-dimensional code engraved on at least one of the tire side surfaces of the pneumatic tire. The inspection method includes:

acquiring an image of the marks and the two-dimensional code;

determining, from the acquired image, an image-based distance between the marks represented by pixels on the image; determining, by using a unit distance corresponding to one pixel on the image determined from information of the distance between the marks on the tire side surface and the image-based distance, at least one of a size of the two-dimensional code on the tire side surface, an amount of positional deviation of an arrangement region of the two-dimensional code on the surface with respect to a predetermined arrangement region of the two-dimensional code defined by the marks, and an amount of inclination of the arrangement region of the two-dimensional code on the surface with respect to the predetermined arrangement region of the two-dimensional code;

and comparing at least one of the size, the amount of positional deviation, or the amount of inclination of the two-dimensional code with the corresponding standard dimensions and determining an acceptability of a position of the engraving of the two-dimensional code.

The size of the two-dimensional code of the standard dimensions is preferably included in display information provided around the two-dimensional code and represented by marks, symbols, or numeral values that are formed identifiable from a region around the marks, symbols, or numeral values by the recesses and protrusions of the surface. Preferably, image processing is performed by acquiring an image of the display information and information of the size of the two-dimensional code is acquired.

Yet another aspect of the present technology is a method for manufacturing a pneumatic tire including a tread portion contactable with a road surface, sidewall portions provided sandwiching the tread portion from opposite sides in a tire lateral direction, and bead portions connected to the sidewall portions and located inward of the sidewall portions in a tire radial direction, the method for manufacturing the pneumatic tire by engraving a two-dimensional code on at least one of the sidewalls of the pneumatic tire.

The method includes at least two marks formed in a protruded shape or a recessed shape. The marks are disposed on an identical position in a first direction of the tire radial direction and a tire circumferential direction and disposed separated from each other at different positions in a second direction of the tire radial direction and the tire circumferential direction to sandwich an outer edge of the predetermined two-dimensional code arrangement region from the opposite sides in the tire radial direction or the tire circumferential direction.

The method includes: determining the predetermined two-dimensional code arrangement region based on the position of the marks on an image of the tire side surface, the position of the marks being detected from the image of the tire side surface; and engraving the two-dimensional code so that dot holes are formed on the tire side surface by identifying the predetermined two-dimensional code arrangement region based on the determined predetermined two-dimensional code arrangement region and by irradiating the identified predetermined two-dimensional code arrangement region on the tire side surface with a laser beam.

According to the foregoing mold for a pneumatic tire and the foregoing method for manufacturing a pneumatic tire, a pneumatic tire on which a two-dimensional code can be engraved in an appropriate position or in an appropriate orientation of the pneumatic tire can be provided. According to the foregoing pneumatic tire, the pneumatic tire can be provided with the two-dimensional code provided in the appropriate position or in the appropriate orientation and sized to have the target dimensions. In addition, according to the foregoing inspection method for inspecting the engraving of a two-dimensional code, the position of the engraving of the two-dimensional code provided on a pneumatic tire or the orientation of the two-dimensional code can be inspected, and whether the two-dimensional code have the target dimensions can be inspected.

BRIEF DESCRIPTION OF DRAWINGS

FIGS. 5A to 5G are diagrams each illustrating another example of the shape of marks according to an embodiment.

FIGS. 9A and 9B are diagrams each illustrating positional deviation and inclination of a two-dimensional code.

DETAILED DESCRIPTION

A pneumatic tire, a mold for a pneumatic tire, an inspection method for inspecting an engraving of a two-dimensional code, and a method for manufacturing a pneumatic tire according to embodiments will be described in detail.

Definitions

In the specification, "tire lateral direction" is the direction parallel with a rotation axis of a pneumatic tire. An outer side in the tire lateral direction is a side distant from a tire centerline CL (see FIG. 1) representing a tire equatorial plane in the tire lateral direction. Also, an inner side in the tire lateral direction is a side closer to the tire centerline CL in the tire lateral direction. A tire circumferential direction is a direction of rotation of the pneumatic tire about the center of the rotation axis. "Tire radial direction" is the direction orthogonal to the rotation axis of the pneumatic tire. "Outward in the tire radial direction" is the direction away from the rotation axis. Similarly, an inner side in the tire radial direction is a side closer to the rotation axis.

A two-dimensional code referred to as in the specification is a one-dimensional code that has information only in the lateral direction (a matrix display type code having information in two directions with respect to a bar-code). The two-dimensional code includes, for example, QR Code (registered trademark), Data Matrix (registered trademark), MaxiCode (registered trademark), PDF417 (registered trademark), Code 16K (registered trademark), Code 49 (registered trademark), Aztec Code (registered trademark), SP Code (registered trademark), Vericode (registered trademark), and CP code (registered trademark).

Pneumatic Tire

Figure 1:
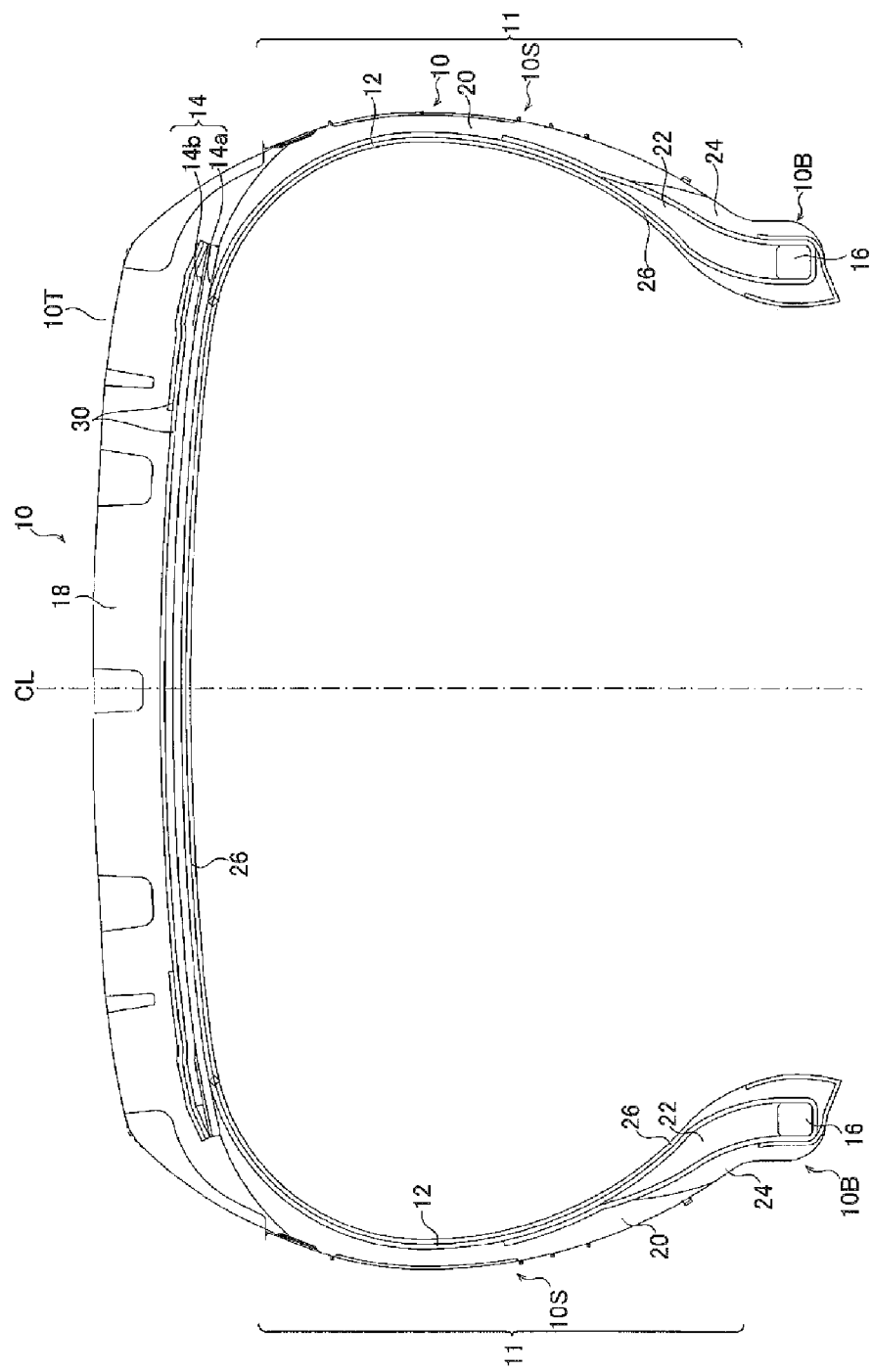
FIG. 1 is a diagram illustrating an example of the configuration of a pneumatic tire according to an embodiment.
Figure 2:
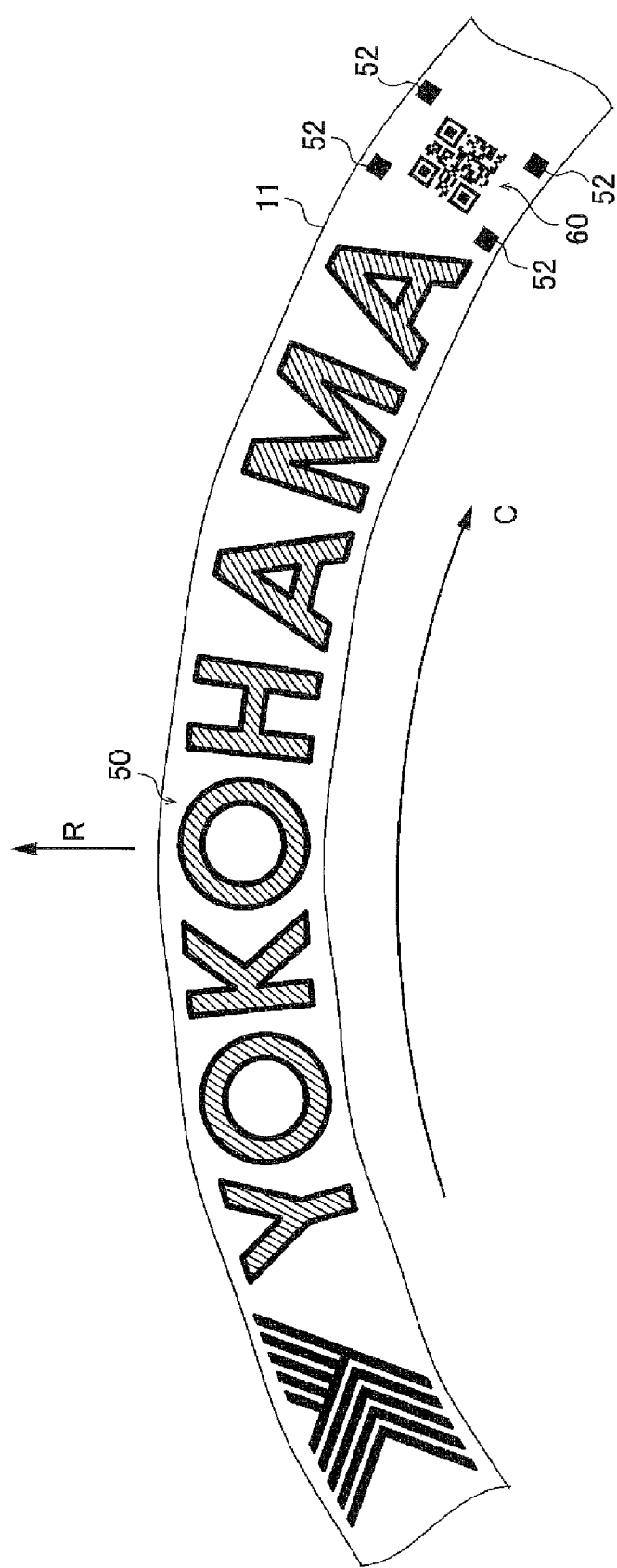
FIG. 2 is a diagram illustrating an example of a region including markings and a two-dimensional code that are part of a tire side surface of a sidewall portion or a bead portion of a pneumatic tire according to an embodiment.

FIG. 1 is a diagram illustrating an example of the configuration of a pneumatic tire 10 (hereinafter simply referred to as "tire 10") according to an embodiment. FIG. 2 is a diagram illustrating an example of a region including markings 50 and a two-dimensional code 60 on a tire side surface of a sidewall portion or a bead portion of the tire 10.

The tire 10 includes a tread portion 10T including a tread pattern, a pair of bead portions 10B, and a pair of sidewall portions 10S provided at the opposite sides of the tread portion 10T and connected to the pair of bead portions 10B and the tread portion 10T. The tread portion 10T is a portion contactable with a road surface. The sidewall portions 10S are provided sandwiching the tread portion 10T from the opposite sides in the tire lateral direction. The bead portion 10B is connected to the sidewall portion 10S and is located inward of the sidewall portion 10S in the tire radial direction.

The tire 10 mainly includes a carcass ply 12, a belt 14, and bead cores 16 as framework members, and the tire 10 mainly includes a tread rubber member 18, side rubber members 20, bead filler rubber members 22, rim cushion rubber members 24, and an innerliner rubber member 26 around the framework members.

The carcass ply 12 includes a carcass ply member that extends in a toroidal shape between a pair of annular bead cores 16 and that is made of organic fibers covered with rubber. The carcass ply 12 wound around the bead cores 16 extends outward in the tire radial direction. The belt 14 including two belt members 14a, 14b is provided outward of the carcass ply 12 in the tire radial direction. The belt 14 includes a member made of steel cords that are covered with rubber and inclined at a predetermined angle, for example, 20 to 30 degrees with respect to the tire circumferential direction. The width of the belt member 14a, which is a lower layer, in the tire lateral direction is greater than the width of the belt member 14b, which is an upper layer, in the tire lateral direction. The steel cords of the two belt members 14a, 14b are inclined in opposite directions. Thus, the belt members 14a, 14b are crossing layers serving to inhibit the carcass ply 12 from being expanded by pressure of air filled into the tire.

The tread rubber member 18 is disposed outward of the belt layer 14 in the tire radial direction. The side rubber members 20 are connected to opposite ends of the tread rubber member 18 and thus forms the sidewall portions 10S. The rim cushion rubber members 24 are provided at the inner ends of the side rubber members 20 in the tire radial direction and come into contact with a rim on which the tire 10 is mounted. The bead filler rubber member 22 is provided outward of the bead core 16 in the tire radial direction so as to be interposed between a portion of the carcass ply 12 which is not wound around the bead core 16 and a portion of the carcass ply 12 which is wound around the bead cores 16. The innerliner rubber member 26 is provided on the inner surface of the tire 10 facing a tire cavity region that is filled with air and is surrounded by the tire 10 and the rim.

In addition, the tire 10 includes a two-layered belt cover 30 made of organic fibers covered with rubber. The belt cover 30 is provided between the belt member 14b and the tread rubber member 18 while covering the belt 14 from the outer side of the belt 14 in the tire radial direction.

Tire Side Surface

FIG. 2 is a diagram illustrating an example of the region including the markings 50 and the two-dimensional code 60 that are part of a tire side surface 11 of the sidewall portion 10S or the bead portion 10B of the tire 10. The markings 50 are a registered trademark in which a character or symbol of deformed "Y" is combined with characters of "YOKOHAMA". The markings 50 are provided so as to be easily visually recognized by a viewer as a manufacturer of the tire 10. The two-dimensional code 60 is provided on the side of the markings 50 in the tire circumferential direction C. Marks 52 are provided at the outer side of four corners of the two-dimensional code 60. Each of the marks 52 has a protruded shape protruding in the normal direction of the tire side surface 11 with respect to the tire side surface 11 around the marks. The mark 52 has a protruded shape. Alternatively, according to an embodiment, the mark 52 may be formed in a recessed shape recessed in the normal direction of the tire side surface 11 with respect to the tire side surface 11 around the marks. The mark 52 formed in a protruded shape or a recessed shape as just described can be visually recognized by a viewer, and the mark 52 has dimensions (size, protruding height, or depth of recess of the mark 52) such that even in a captured image of the tire side surface 11, the position and shape of the mark 52 can be extracted by image processing. The mark 52 is sized having a circular shape, a rectangular shape, or a specific shape, the area of which is, for example, from 0.25 mm$^2$ to 100.0 mm$^2$. The protruding height of the mark 52 or the depth of recess of the mark 52 is, for example, from 0.3 mm to 5.0 mm.

At least two of the marks 52 are disposed at the same position in a first direction of the tire radial direction R and the tire circumferential direction C and disposed separated from each other at different positions in a second direction of the tire radial direction R and the tire circumferential direction to sandwich the outer edge of the two-dimensional code 60 from the opposite sides in the tire radial direction R and the tire circumferential direction C. According to an embodiment, the shape obtained by connecting the center positions of the four marks 52 with straight lines is preferably a quadrangular shape, a rectangular shape, or a substantially rectangular shape, and the two-dimensional code 60 is provided in the quadrangular shape. Hereinafter, a rectangular shape or a substantially rectangular shape will be referred altogether to as a rectangular shape. In other words, the rectangular shape is a rectangular frame (quadrangular frame) 54, described below. The size and orientation of the rectangular shape, and the position of the rectangular shape on the surface of the tire side surface 11 are identified with the marks 52.

The four marks 52 includes, for example, a first pair of marks (marks A) provided at the same position in the tire radial direction R and provided at different positions in the tire circumferential direction C, and a second pair of marks (marks B) provided at positions different from the position of the pair of marks A in the tire radial direction R and at the same position to each other in the tire radial direction R and provided at different positions in the tire circumferential direction C.

The marks 52 as just described may be positioning markers for engraving the two-dimensional code 60 in an appropriate position and in an appropriate orientation on the tire side surface 11 of an unengraved tire at the time of engraving.

Additionally, the marks 52 can be used as markers for inspecting whether the two-dimensional code 60 engraved in the tire 10 is provided in an appropriate location and in an appropriate orientation, and further for inspecting whether the two-dimensional code 60 is sized having target dimensions. Inspection and engraving of the two-dimensional code will be described later.

Figure 3:
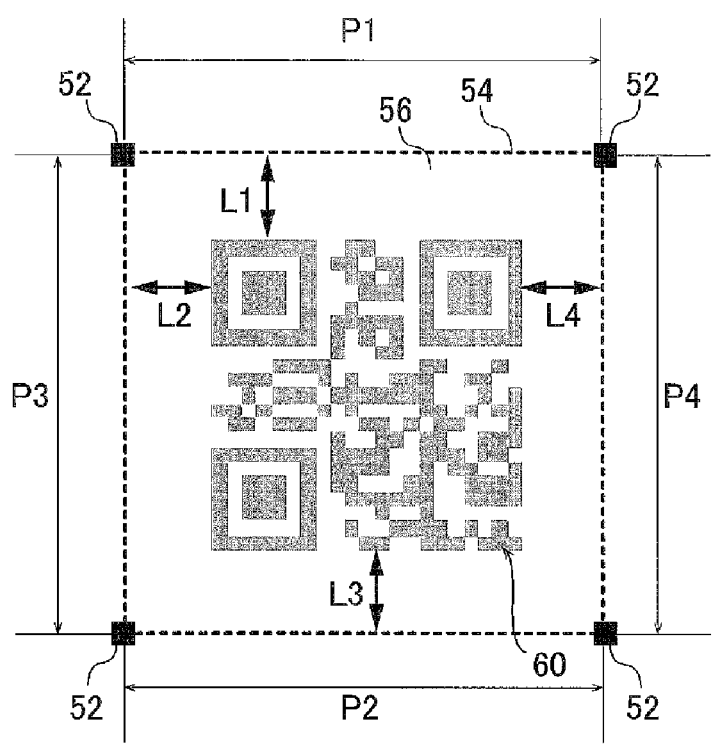
FIG. 3 is a diagram illustrating the position and orientation of a quadrangular frame defined by marks according to an embodiment.

According to an embodiment, the marks 52 are markers that defines the rectangular frame (quadrangular frame) 54 (see FIG. 3), and the size and orientation of the rectangular frame 54 and the position of the rectangular frame 54 on the surface of the tire side surface 11 are identified with the marks 52. The outer edge of the two-dimensional code 60 is preferably provided within the rectangular frame 54 without being in contact with the rectangular frame 54. In other words, the two-dimensional code 60 is preferably provided inside the rectangular frame 54. Also, in other words, the shape obtained by connecting the center positions of the marks 52 with straight lines is preferably a quadrangular shape such as a rectangular shape or a substantially rectangular shape, and the distance between the marks 52 and the positions of the marks 52 are preferably set such that the two-dimensional code 60 is provided inside the quadrangular shape. In inspecting the engraving of the two-dimensional code 60 or reading the two-dimensional code 60, the inside of the rectangular frame 54 is searched, and thus the two-dimensional code 60 can be surely extracted. FIG. 3 is a diagram illustrating the position and orientation of the rectangular frame 54.

In particular, a region of the surface of the tire side surface 11, which is located between the outer edge of the two-dimensional code 60 and the rectangular frame 54 is preferably a smooth surface 56 having no ridges or surface unevenness. Even in a case where ridge-shaped unevenness for displaying side patterns or markings is provided at the outer side of the rectangular frame 54 and in a case where the surface unevenness of the two-dimensional code 60 is measured and the information of the two-dimensional code 60 is read, the ridges forming the side patterns are disposed close to the rectangular frame 54 in a contact manner even when the ridges are easily distinguished from the surface unevenness of the two-dimensional code 60 due to the smooth surface 56. Thus, the two-dimensional code 60 can be easily identified and read. The surface roughness (arithmetic mean roughness Ra: JIS B0601 2001) of the smooth surface 56 is 25 μm or less and is preferably from 2 to 10 μm. The surface roughness (arithmetic mean roughness Ra) is preferably less than the surface roughness of the smooth surface around the rectangular frame 54.

Figure 4:
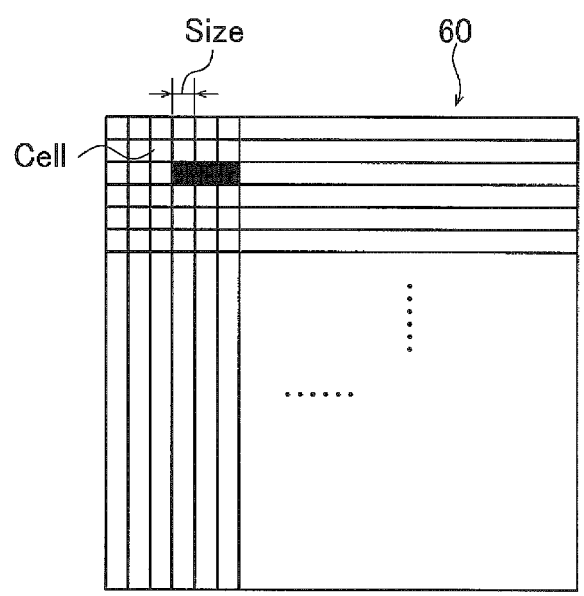
FIG. 4 is a diagram illustrating an example of the configuration of a two-dimensional code according to an embodiment.

According to an embodiment, the two-dimensional code 60 engraved on the tire side surface 11 includes one dot hole (a recessed portion) provided in a dot representing a unit cell region Cell of a darkened region (see FIG. 4) of the unit cell regions Cell of the two-dimensional code 60. As illustrated in FIG. 4, the two-dimensional code 60 has a structure in which an arrangement region of the two-dimensional code 60 surrounded by the outer edge of the two-dimensional code 60 corresponds to the plural unit cell regions Cell obtained by dividing the arrangement region into rectangular grids having the same size and in which dot holes (recessed portions) of recesses and protrusions of the surface are arranged such that each of the dot holes (recessed portions) forms the single unit cell region Cell of a darkened portion of gray scale elements. For example, one dot hole is formed in one darkened region. FIG. 4 is a diagram illustrating an example of the configuration of the two-dimensional code 60. In FIG. 4, the darkened region is indicated by a region blackened out.

In this case, according to an embodiment, separation distances L1 to L4 between the arrangement region of the two-dimensional code 60 and the rectangular frame 54 (the separation distances L1 to L4 are each the maximum separation distance between the rectangular frame 54 and each of opposite sides of the outer edge of the arrangement region of the two-dimensional code 60) are each preferably eight or more times longer than a size Size (see FIG. 4) of the unit cell region Cell. Here, when the unit cell region Cell has a square shape, the size Size of the unit cell region Cell is the length of one side of the square shape. When the unit cell region Cell has a rectangular shape, the size Size of the unit cell region Cell is the length of the long side of the rectangular shape. The separation distances L1 to L4 are each preferably 20 or less times longer than the size Size (see FIG. 4). The separation distances L1 to L4 are defined as described above. Thus, even when the vertexes of the arrangement region (rectangular shape) of the two-dimensional code 60 are misaligned with respect to the vertexes of a predetermined arrangement region of the two-dimensional code 60, the vertexes of the arrangement region are not located out of the rectangular frame 54. Even in a case where the surface unevenness of the two-dimensional code 60 is measured and thus the information of the two-dimensional code 60 is read, the two-dimensional code 60 is surely distinguished from the unevenness of the ridges provided around the rectangular frame 54 and thus can be identified and easily read.

In addition, the outer edge of the two-dimensional code 60 is preferably formed in a rectangular shape, and the two-dimensional code 60 is preferably provided such that the sides of the outer edge of the two-dimensional code 60 are parallel to the sides of the rectangular frame 54.

In an embodiment where the periphery of the two-dimensional code 60 is surrounded by the rectangular frame 54 instead of the marks 52, the rectangular frame is noticeable as the side patterns of the tire and thus is not preferable in terms of side design. Further, it is difficult to find the center of the width of each side of the rectangular frame from the unevenness of the rectangular frame. Furthermore, it is difficult to accurately determine the amount of positional deviation of the two-dimensional code 60 or the amount of inclination of the orientation of the two-dimensional code 60. Thus, the four marks 52 are designed as markers separated from each other in the tire circumferential direction C or the tire radial direction R to sandwich the arrangement region of the two-dimensional code 60 from the opposite sides in the tire circumferential direction C and the tire radial direction R.

FIGS. 5A to 5G are diagrams each illustrating an example of the marks 52 according to another embodiment. The rectangular frame 54, the size, orientation, and position of which are identified with the marks 52 can be defined.

Each of the marks 52 may be formed in a rectangular shape, a circular shape, or another shape.

As illustrated in FIGS. 5A and 5B, the number of marks 52 may be two marks. The center positions of the two marks 52 are connected to form a line segment as one side of the rectangular frame 54 and the rectangular frame 54 having such one side and a square shape can be defined. When the marks 52 are located on the same position in the tire circumferential direction C, the rectangular frame 54 is set in advance on one side in the tire circumferential direction (on the right side in the example illustrated in FIG. 5A). When the marks 52 are located on the same position in the tire radial direction R, the rectangular frame 54 is set in advance on one side in the tire radial direction (on the upper side in the example illustrated in FIG. 5B).

In addition, as illustrated in FIGS. 5C and 5D, each of the center positions of the four or two marks 52 is the center of one side of the rectangular frame 54 and the rectangular frame 54 having such one side and a square shape can be defined. The rectangular frame 54 having a square shape can be defined by the two marks 52 illustrated in FIG. 5D such that the center position of each of the marks 52 is the center of each of two sides opposed to each other.

When the rectangular frame 54 has a square shape having four sides with the same length, the rectangular frame 54 having the square shape can be primarily defined by a distance between the two marks 52. However, when the rectangular frame 54 has a rectangular shape, the rectangular frame 54 having the rectangular shape cannot be primarily defined by the two marks 52. Thus, the arrangements described below are preferably provided in advance. For example, a line segment between the two marks 52 is preferably parallel to the long side (or the short side) of the rectangular shape of the rectangular frame 54 to be defined. In addition, the length of the long side (or the short side) corresponds to the length of the line segment, and meanwhile the length of the short side (or the long side) corresponds to a length obtained by multiplying the length of the long side (or the short side) by a certain multiplying factor. With the arrangements, the rectangular frame 54 having a rectangular shape can be also defined by the two marks 52.

In addition, each of the marks 52 may be formed in a bent shape bent in an L-shape illustrated in FIG. 5E (set such that one vertex of the rectangular frame 54 is located at a bending point of the bent portion of the mark 52), a triangular shape illustrated in FIG. 5F (set such that one vertex of the rectangular frame 54 is located at one vertex of the triangular shape of the mark 52), or a star shape illustrated in FIG. 5G (set such that one vertex of the rectangular frame 54 is located at the center of the mark 52).

As just described, according to an embodiment, in a case where the two marks 52 are provided, the distance between the marks 52 is preferably the length of one side of the rectangular frame 54, and the marks 52 are preferably arranged in parallel to one side of the rectangular frame 54.

Also, according to an embodiment, in a case where the mark 52 includes two pairs of marks 52, that is, four marks 52, the vertex of the rectangular frame 54 is preferably located at the position of the mark 52, for example, at the center of the mark 52.

In the present embodiment, the two-dimensional code 60 engraved on the tire side surface 11 includes one recessed portion (a dot hole) provided in a dot that represents the unit cell region Cell in the darkened region of the unit cell region Cells of the two-dimensional code 60.

Mold

After an unengraved tire is produced from vulcanization, the two-dimensional code 60 is engraved in an appropriate orientation in a predetermined position, and thus the tire 10 as just described is obtained.

Figure 6:
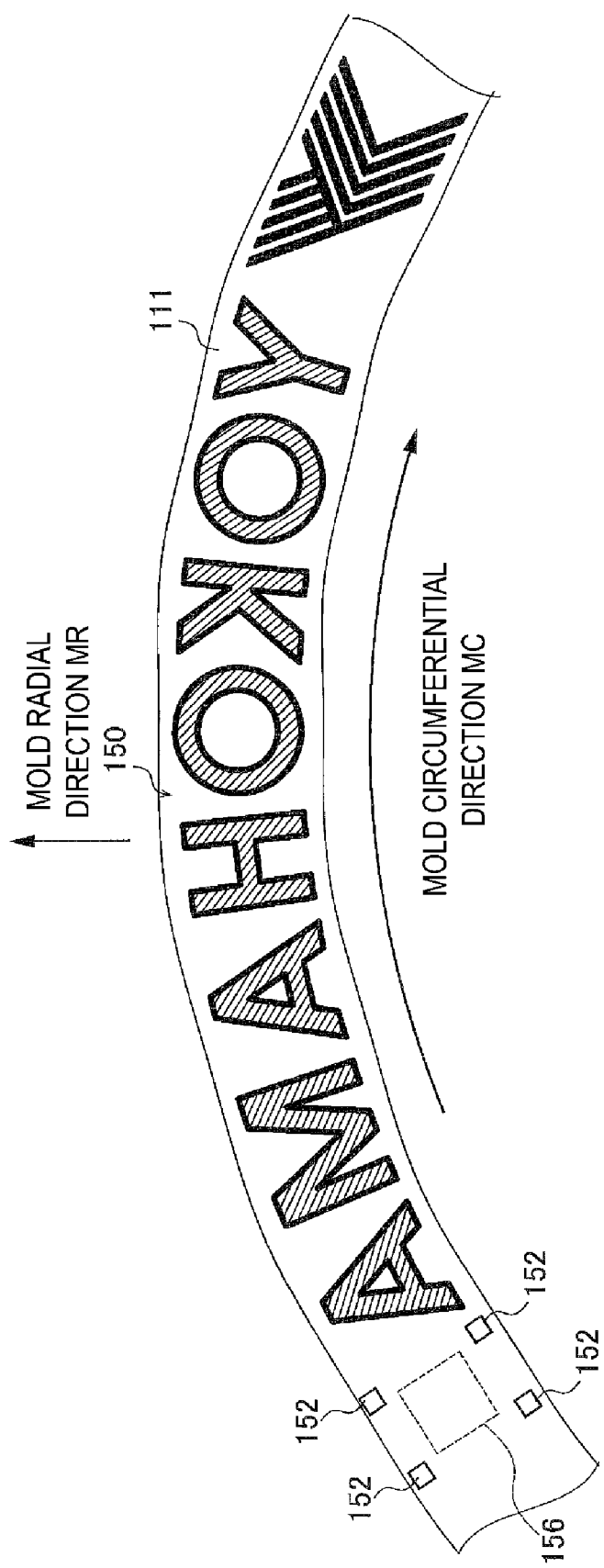
FIG. 6 is a diagram illustrating an example of an inner surface of a mold used in an embodiment.

An embodiment of a tire mold for manufacturing such an unengraved tire is illustrated in FIG. 6. FIG. 6 is a diagram illustrating an example of an inner surface of the mold according to an embodiment.

As illustrated in FIG. 6, an inner surface 111 of the mold to be brought into contact with a tire side surface of the unengraved tire includes a markings corresponding region 150 corresponding to the markings 50 and four mark corresponding regions 152 each having a recessed hole. Furthermore, the inner surface 111 includes a predetermined arrangement corresponding region 156 having a smooth surface and corresponding to a predetermined two-dimensional code arrangement region that includes the smooth surface 56 to be engraved with the two-dimensional code 60. The mark corresponding regions 152 are disposed on the same position in a third direction of a mold radial direction MR and a mold circumferential direction MC and disposed separated from each other at different positions in a fourth direction of the mold radial direction MR and the mold circumferential direction MC to sandwich the outer edge of the predetermined arrangement corresponding region 156 from the opposite sides in the mold radial direction MR or the mold circumferential direction MC. The mold radial direction MR corresponds to the tire radial direction R, and the mold circumferential direction MC corresponds to the tire circumferential direction C.

According to another embodiment, instead of the four mark corresponding regions 152, the inner surface 111 preferably includes two mark corresponding regions 152 each having a recessed shape.

According to another embodiment, instead of the two or four mark corresponding regions 152 that are recessed holes, the inner surface 111 preferably includes two or four mark corresponding regions 152 as protrusions each having a protruded shape.

By using such a mold, an unengraved tire on which the predetermined arrangement region of the two-dimensional code 60 has a smooth surface without the engraved two-dimensional code 60 can be produced from vulcanization.

Engraving of Two-Dimensional Code

Figure 7:
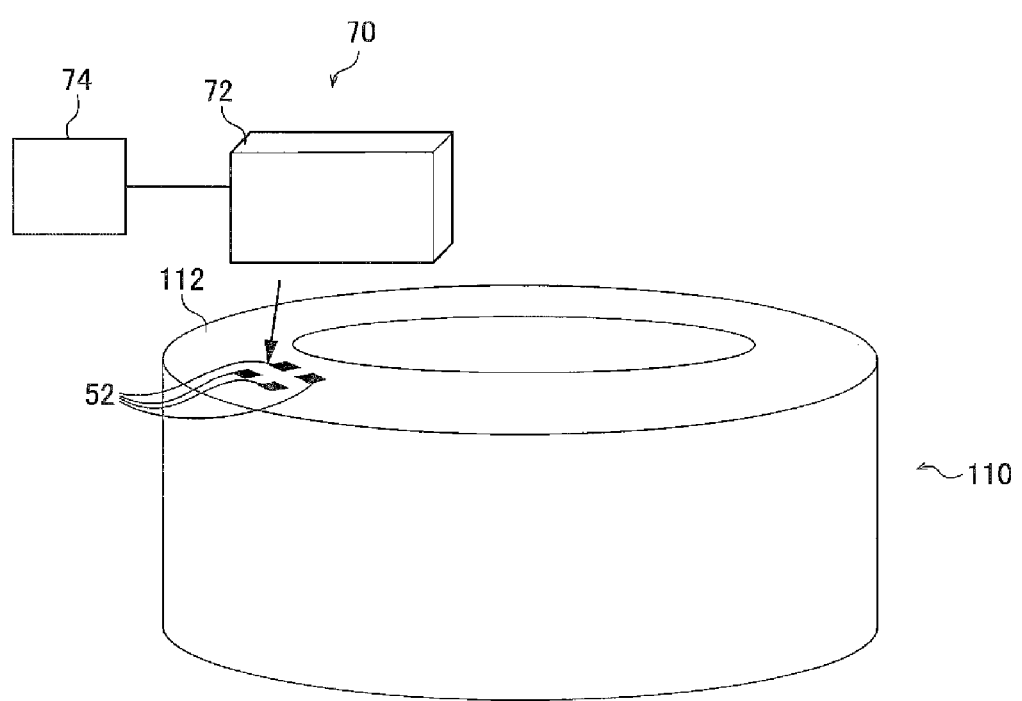
FIG. 7 is a diagram illustrating an engraving device that engraves a two-dimensional code on a tire side surface of an unengraved tire in a method for manufacturing a tire according to an embodiment.

FIG. 7 is a drawing schematically illustrating an engraving device 70 that engraves the two-dimensional code 60 on a tire side surface 112 of the unengraved tire 110.

The engraving device 70 includes a laser irradiation unit 72 and an engraving control unit 74. The engraving device 70 is a device that forms dot holes of a desired dot pattern by turning on/off the laser beam and forming a dot hole in a portion corresponding to the darkened region of the unit cell region Cell of the two-dimensional code 60 to be engraved. Thus, the tire side surface 11 is irradiated in dots with a laser beam having a high energy density to the extent that the rubber of the tire side surface 11 melts and volatilizes by the laser beam irradiation. The forming of the dot holes by the laser beam is performed while moving, relative to the tire 10 in the tire radial direction R and the tire circumferential direction C, the irradiation position on the tire side surface 11 to be irradiated with the laser beam from the laser irradiation unit 72.

The laser irradiation unit 72 further includes a sensor that captures an image of the tire side surface 11. The captured image is configured to be subjected to image processing by the engraving control unit 74. The engraving control unit 74 further identifies, from the captured image, the position of the marks 52 in the image, and on the basis of the position of the marks 52, determines, on the smooth surface 56, a predetermined arrangement region of the two-dimensional code 60 on which the two-dimensional code 60 is to be engraved. The predetermined arrangement region of the two-dimensional code 60 is determined such that four positions separated by a predetermined distance from the position of the four vertexes of the rectangular frame 54 defined by the marks 52 are four vertexes of a rectangular shape. The method for identifying the position of the marks 52 is not limited to a method of performing image processing on the captured image of the tire side surface 11. According to an embodiment, preferably, the surface unevenness of the tire side surface 11 is measured and the engraving control unit 74 identifies the position of the marks 52 each having a protruded shape or a recessed shape from a surface unevenness image obtained by data imaging of the surface unevenness. Alternatively, on the basis of the position of the marks 52 in the image that an operator can confirm on a monitor, the predetermined arrangement region of the two-dimensional code 60 on which the two-dimensional code 60 is to be engraved may be determined on the smooth surface 56.

Thus, when manufacturing the tire 10 by engraving the two-dimensional code 60, (1) the engraving control unit 74 determines, based on the position of the marks 52 on the image detected from the image of the tire side surface 11 including the marks 52, a predetermined arrangement region of the two-dimensional code 60 on the image.

(2) Next, the engraving control unit 74 identifies, based on the determined predetermined arrangement region of the two-dimensional code 60 on the image, a predetermined arrangement region of the two-dimensional code 60 on the surface of the tire side surface 11. Then, the identified predetermined arrangement region of the two-dimensional code 60 on the surface of the tire side surface 11 is irradiated with a laser beam from the laser irradiation unit 72, and thus dot holes are formed on the surface of the tire side surface 11. Consequently, the two-dimensional code 60 is engraved. When identifying the predetermined arrangement region of the two-dimensional code 60 on the surface of the tire side surface 11, the predetermined arrangement region can be identified with the marks 52 as markers.

When forming the dot holes in different positions in the tire radial direction R of the tire side surface 11 by using the laser beam, the laser beam is moved in an inclined state over the tire side surface 11. In addition, since the tire side surface 11 has a curved shape curved into a shape protruded outward in the tire lateral direction, the inclination of the laser beam and the curved shape of the tire side surface 11 act synergistically, and thus the dot holes having different sizes are formed and the lengths of the unit cell regions Cell in the tire radial direction R of the two-dimensional code 60 are changed. In other words, the engraved two-dimensional code 60 on the tire is likely to strain in the tire radial direction R. Such strain is likely to cause a wrong reading result upon reading the two-dimensional code 60. Thus, the strain described above is preferably reduced in order to suppress an error in reading. Accordingly, since degree of curvature of the curved shape of the tire side surface 11 differs depending on the size or aspect ratio of the tire 10, the predetermined arrangement region that realizes the two-dimensional code 60 less likely to strain is defined in advance. The position of the mark 52 is determined so that the two-dimensional code 60 is provided in the predetermined arrangement region as just described. Accordingly, preferably, the two-dimensional code 60 is accurately engraved in the predetermined arrangement region defined by the marks 52.

The engraving control unit 74 engraves the two-dimensional code 60 in the predetermined arrangement region determined by the marks 52 while performing correction so as to curb the influence of the curved shape. Even in such a case, since the tire 10 is an elastic body, the curved shape of the side portion of the tire 10 changes. Consequently, the position actually engraved by the engraving control unit 74 may be easily deviated from the predetermined arrangement region. Also, the position actually engraved by the engraving control unit 74 may be easily deviated from the predetermined arrangement region by, for example, errors made by a positioning device that performs handling of the tire 10.

Thus, for the tire 10 on which the two-dimensional code 60 is engraved, an inspection is desired to be performed on the engraving of the two-dimensional code 60.

Inspection on Two-Dimensional Code

Figure 8:
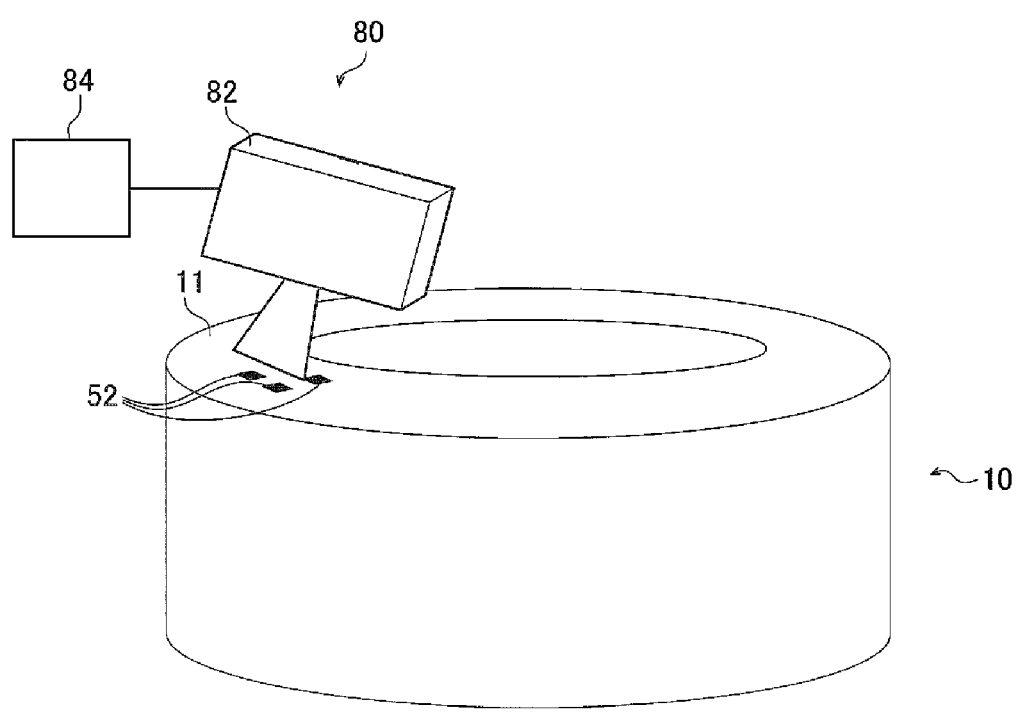
FIG. 8 is a diagram illustrating an example of an inspection device that inspects an engraving of a two-dimensional code of a tire according to an embodiment.

FIG. 8 is a diagram schematically illustrating an example of an inspection device 80 that inspects the engraving of the two-dimensional code 60 engraved on the tire side surface 11 of the tire 10.

The inspection device 80 includes a measuring unit 82 and an inspection control unit 84. The measuring unit 82 includes an imaging device that captures the two-dimensional code 60 and the marks 52, and the measuring unit 82 sends the captured image to the inspection control unit 84. The inspection control unit 84 performs image processing on the captured image, determines the position and orientation of the engraved two-dimensional code 60, and determines the position of the center of the mark 52. The inspection control unit 84 determines the size of the two-dimensional code 60, the amount of positional deviation with respect to the marks 52, and the amount of inclination with respect to the marks 52 by using information on the determined position and orientation. Thus, the inspection control unit 84 determines the acceptability of the two-dimensional code 60.

Note that the inspection device 80 is designed to measure the two-dimensional code 60 and the marks 52 by capturing an image of the two-dimensional code 60 and the marks 52, but is not limited thereto. According to an embodiment, the inspection device 80 is preferably designed to perform shape measurement of the surface unevenness of the two-dimensional code 60 and the marks 52 instead of capturing an image of the two-dimensional code 60 and the marks 52 by using the imaging device. In this case, the inspection control unit 84 uses, from the shape measurement data obtained by the shape measurement, the image representing the unevenness of the two-dimensional code 60 and the marks 52 by pixels, and thus determines the size of the two-dimensional code 60, the amount of positional deviation with respect to the marks 52, and the amount of inclination with respect to the marks 52.

When inspecting the engraving of the two-dimensional code 60 by using the inspection device 80 as just described, (1) the measuring unit 82 acquires an image of the marks 52 and the two-dimensional code 60.

(2) The inspection control unit 84 determines, from the acquired image, image-based distances (P1 to P4 illustrated in FIG. 3) between the marks 52 indicated in pixel units on the image.

(3) Furthermore, the inspection control unit 84 determines a unit distance corresponding to one pixel on the image from information of known distances between the marks 52 on the tire side surface 11 and the image-based distances. The inspection control unit 84 determines, by using the unit distance, the dimensions (dimensions in pixel units) of the two-dimensional code 60 on the image, the size of the two-dimensional code 60 on the tire side surface 11, the amount of positional deviation of the arrangement region of the two-dimensional code 60 on the surface of the tire side surface 11 with respect to the predetermined arrangement region of the two-dimensional code 60, which is defined by the marks 52, and the amount of inclination of the arrangement region of the two-dimensional code 60 on the surface of the tire side surface 11 with respect to the predetermined arrangement region of the two-dimensional code 60.

(4) The inspection control unit 84 compares the size, the amount of positional deviation, and the amount of inclination of the two-dimensional code 60 with the corresponding standard dimensions and thus determines the acceptability of the position of the engraving of the two-dimensional code 60.

FIGS. 9A and 9B are diagrams each illustrating an example of the positional deviation and inclination of the two-dimensional code 60.

As illustrated in FIG. 9A, the inspection control unit 84 determines, by image processing, four straight lines Lines 1 to 4 contacting the outer edge of the two-dimensional code 60. In addition, the inspection control unit 84 calculates intersections of the four straight lines Lines 1 to 4 and determines coordinates of the intersections C1 to C4 on the image. In the illustrated example, the coordinates of intersections C1, C2, C3, and C4 are (x1, y1), (x2, y2), (x3, y3), and (x4, y4). Also, the inspection control unit 84 determines position coordinates of the centers of the respective marks 52 on the image, and uses the coordinates and thus determines four lines representing four sides of the rectangular frame 54 on the image. Thus, as illustrated in FIG. 9B, distances dx1 to dx4, dy1 to dy4 from the respective sides of the rectangular frame 54 to the intersections C1 to C4 can be determined.

The inspection control unit 84 multiplies each of the distances dx1 to dx4, dy1 to dy4 by the aforementioned unit distance corresponding to one pixel on the image, and determines the amount obtained by subtracting a value α previously determined from the multiplication result, as the amount of positional deviation of the arrangement region of the two-dimensional code 60 on the tire side surface 11 with respect to the predetermined arrangement region of the two-dimensional code 60. The previously determined value α is a distance in two directions between the vertex of the rectangular frame 54 and the corresponding vertex of the arrangement region of the two-dimensional code 60 in an ideal arrangement in which there is no positional deviation of the rectangular arrangement region of the two-dimensional code 60 with respect to the predetermined arrangement region of the two-dimensional code 60. The amount of positional deviation of each of the vertexes of the arrangement region is determined, but of the amounts of positional deviation, the amount of maximum positional deviation is regarded as the amount of positional deviation. Thus, the predetermined arrangement region on the tire side surface 11 is referred to as the predetermined arrangement region of the two-dimensional code 60, which is a rectangular region, vertexes of which are four positions having position coordinates obtained by subtracting the previously determined value α from the position coordinates of the four vertexes of the rectangular frame 54 determined by the marks 52. The inspection control unit 84 compares the amount of positional deviation of the two-dimensional code 60 with the corresponding standard dimensions, and thus determines the acceptability of the amount of positional deviation.

Further, the inspection control unit 84 determines the product of multiplication of a difference between the distance dx1 and the distance dx2, a difference between the distance dx1 and the distance dx3, a difference between the distance dx2 and the distance dx4, or a difference between the distance dx3 and the distance dx4 by the aforementioned unit distance corresponding to one pixel on the image, as the amount of inclination of the two-dimensional code 60 on the tire side surface 11. The inspection control unit 84 compares the amount of inclination with the corresponding standard dimensions and thus determines the acceptability of the amount of inclination. Furthermore, the inspection control unit 84 determines the production of multiplication of the distance between intersection C1 and the intersection C2, the distance between the intersection C1 and the intersection C3, the distance between the intersection C2 and the intersection C4, or the distance between the intersection C3 and the intersection C4 on the image by the aforementioned unit distance corresponding to one pixel on the image, as the size of the two-dimensional code 60 on the tire side surface 11. The inspection control unit 84 compares the size with the corresponding standard dimensions and thus determines the acceptability of the size of the two-dimensional code 60.

In a case where the inspection control unit 84 determines that all of the size, the amount of positional deviation, and the amount of inclination of the two-dimensional code 60 match the corresponding standard dimensions within an acceptable range, the inspection control unit 84 determines that the engraving of the two-dimensional code 60 are acceptable.

Note that in the embodiments described above, the size, the amount of positional deviation, and the amount of inclination of the two-dimensional code 60 are inspected.

Alternatively, according to an embodiment, at least one of the size, the amount of positional deviation, and the amount of inclination of the two-dimensional code 60 is preferably regarded as an object to be inspected.

According to an embodiment, the information of the size of the two-dimensional code 60 may be included in display information represented by marks, symbols, or numeral values formed by the recesses and protrusions of the tire side surface 11 so as to be identified from a region around the marks, symbols, or numeral values. The display information is preferably provided around the two-dimensional code 60. The measuring unit 82 measures the display information simultaneously when measuring the two-dimensional code 60 and the marks 52, and performs image processing on an image of the display information obtained by measurement by the inspection control unit 84. Thus, the measuring unit 82 may acquire the information of the size of the two-dimensional code 60. This information is the standard dimensions for size.

Figure 10A:
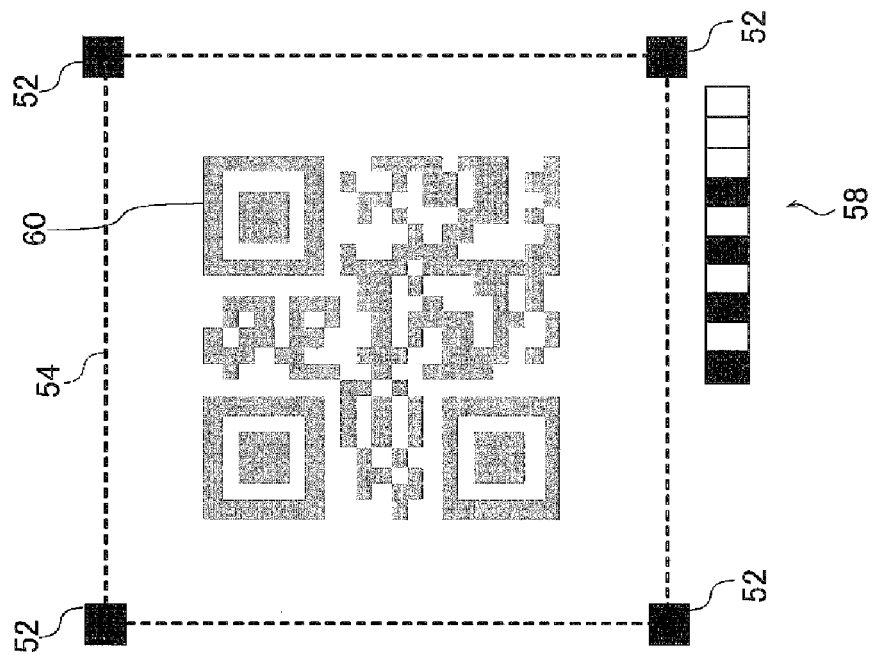
FIGS. 10A and 10B are diagrams each illustrating an example of display information used in an embodiment.
Figure 10B:
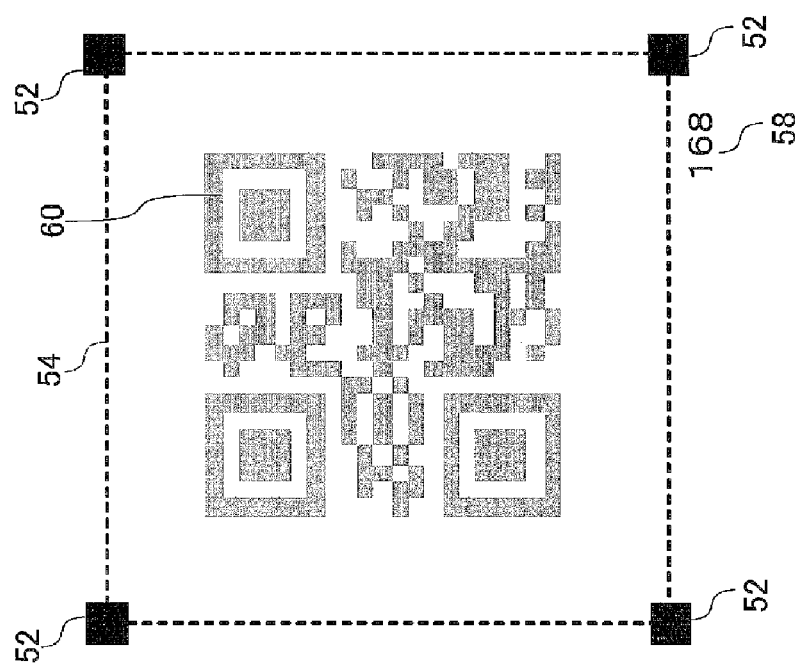

FIGS. 10A and 10B are diagrams each illustrating an example of information 58 described above. As illustrated in FIG. 10A, a number representing the size may be directly displayed. "168" as the display information 58 in FIG. 10A means the size of 16.8 mm. Also, as illustrated in FIG. 10B, the display information 58 may be represented a one-dimensional code. According to an embodiment, the one-dimensional code is preferably provided by engraving in the same way as the two-dimensional code 60.

In the embodiments described above, the marks 52 each having a recessed shape or a protruded shape are provided on the tire side surface 11 of the unengraved tire. The marks 52 are disposed on the same position in the first direction of the tire radial direction R and the tire circumferential direction C and disposed separated from each other at different positions in the second direction of the tire radial direction R and the tire circumferential direction C to sandwich the outer edge of the predetermined arrangement region of the two-dimensional code 60 from the opposite sides in at least one of the tire radial direction R or the tire circumferential direction C. Thus, the two-dimensional code 60 can be easily engraved in an appropriate position or in an appropriate orientation. That is, the embodiments described above may provide a pneumatic tire including a two-dimensional code engraved in an appropriate position or in an appropriate orientation.

In addition, since the two-dimensional code 60 and the marks 52 are provided on the tire side surface 11, whether the two-dimensional code 60 is disposed in an appropriate position or engraved in an appropriate orientation, and whether the size of the two-dimensional code 60 has target dimensions that can be easily inspected.

As described above, a pneumatic tire, a mold for a pneumatic tire, an inspection method for inspecting an engraving of a two-dimensional code, and a method for manufacturing a tire according to the present technology are described in detail; however, the present technology is not limited to the foregoing embodiments. It will be understood that various modification or changes may be made to the present technology without departing from the scope of the present technology.

The invention claimed is:

1. A pneumatic tire, comprising:
a tread portion contactable with a road surface;
sidewall portions provided sandwiching the tread portion from opposite sides in a tire lateral direction; and
bead portions connected to the sidewall portions and located inward of the sidewall portions in a tire radial direction, wherein
at least one tire side surface of the sidewall portions or the bead portions includes:
a two-dimensional code in which a dot pattern is formed by two types of gray scale elements formed identifiable from each other by recesses and protrusions of the at least one tire side surface;
only two marks formed in a protruded shape or a recessed shape, the two marks being disposed on an identical position in a first direction of the tire radial direction and a tire circumferential direction and disposed separated from each other at different positions in a second direction of the tire radial direction and the tire circumferential direction to sandwich an outer edge of the two-dimensional code from opposite sides in at least one of the tire radial direction or the tire circumferential direction;
each of the two marks serves as a marker that defines a quadrangular frame, and a size and orientation of the quadrangular frame and a position of the quadrangular frame on the at least one tire side surface are identified with the two marks,
the outer edge of the two-dimensional code is provided within the quadrangular frame without being in contact with the quadrangular frame,
a distance between the two marks is a length of one side of the quadrangular frame,
the two marks are aligned in parallel to one side of the quadrangular frame,
the two marks are each smaller in the tire radial direction and in the tire circumferential direction than respective radial and circumferential dimensions of the two-dimensional code,
the two-dimensional code has a structure in which an arrangement region of the two-dimensional code surrounded by the outer edge of the two-dimensional code corresponds to a plurality of unit cell regions obtained by dividing the arrangement region into rectangular grids having an identical size and in which recessed portions of the recesses and protrusions of the at least one tire side surface are arranged such that each of the recessed portion forms one of the plurality of unit cell regions, which is a darkened portion of the gray scale elements, and
the two-dimensional code is a QR Code®, and a separation distance between the arrangement region and the quadrangular frame is from eight to twenty times greater than a size of an individual unit cell region of the plurality of unit cell regions.

2. The pneumatic tire according to claim 1, wherein a region of the at least one tire side surface, which is disposed between the outer edge and the quadrangular frame, is a smooth surface.

3. The pneumatic tire according to claim 2, wherein the outer edge of the two-dimensional code has a rectangular shape, and
the two-dimensional code is disposed such that at least one side of the outer edge of the two-dimensional code is parallel to one side of the quadrangular frame.

4. The pneumatic tire according to claim 1, wherein the outer edge of the two-dimensional code has a rectangular shape, and
the two-dimensional code is disposed such that at least one side of the outer edge of the two-dimensional code is parallel to one side of the quadrangular frame.

5. The pneumatic tire according to claim 1, wherein:
the arrangement region corresponds to a region defined by the outer edge of the two-dimensional code, and
the individual unit cell region is smaller than the arrangement region.

6. The pneumatic tire according to claim 1, wherein:
the two marks are each closer in proximity to a respective side of the two-dimensional code than a distance from one side of the two-dimensional code to an opposite side of the two-dimensional code.

7. A pneumatic tire, comprising:
a tread portion contactable with a road surface;
sidewall portions provided sandwiching the tread portion from opposite sides in a tire lateral direction; and
bead portions connected to the sidewall portions and located inward of the sidewall portions in a tire radial direction, wherein
at least one tire side surface of the sidewall portions or the bead portions includes:
a two-dimensional code in which a dot pattern is formed by two types of gray scale elements formed identifiable from each other by recesses and protrusions of the at least one tire side surface; and
at least four marks formed in a protruded shape or a recessed shape to sandwich an outer edge of the two-dimensional code from opposite sides in at least one of the tire radial direction or a tire circumferential direction, each of the at least four marks being separated from each other mark of the at least four marks,
each of the marks serves as a marker that defines a rectangular frame, and a size and orientation of the rectangular frame and a position of the rectangular frame on the at least one tire side surface are identified with the marks,
the outer edge of the two-dimensional code is provided within the rectangular frame without being in contact with the rectangular frame,
the mark includes a first pair of marks disposed on an identical position in the tire radial direction and disposed at different positions in the tire circumferential direction, and a second pair of marks disposed at a position different from the position of the first pair of marks in the radial direction and on an identical position with each other in the tire radial direction and disposed at different positions in the tire circumferential direction, and
vertexes of the rectangular frame are located at the first pair of marks and the second pair of marks.

\* \* \* \* \*